United States Patent
Buchanan et al.

[11] Patent Number: 5,958,359
[45] Date of Patent: Sep. 28, 1999

[54] PROCESS FOR TREATING $H_2S$-LEAN STREAMS, WITH RECYCLE OF SOX FROM BURNER

[75] Inventors: John S. Buchanan, Trenton, N.J.; Khushrav E. Nariman, Chantilly, Va.

[73] Assignee: Mobil Oil Corporation, Fairfax, Va.

[21] Appl. No.: 08/992,168

[22] Filed: Dec. 17, 1997

[51] Int. Cl.⁶ .......................... B01D 53/52; C01B 17/04
[52] U.S. Cl. ............................ 423/573.1; 423/574.1; 423/244.01; 423/230; 423/244.09
[58] Field of Search .................. 423/230, 242.1, 423/244.01, 244.09, 244.1, 244.11, 542, 573.1, 574.1

[56] References Cited

U.S. PATENT DOCUMENTS

| | | | |
|---|---|---|---|
| 4,283,380 | 8/1981 | Voirin et al. | 423/574 R |
| 4,725,417 | 2/1988 | Deschamps et al. | 423/244 |
| 4,836,993 | 6/1989 | Bertolacini et al. | 423/244 |
| 5,229,091 | 7/1993 | Buchanan et al. | 423/244.01 |
| 5,514,351 | 5/1996 | Buchanan et al. | 423/220 |
| 5,547,648 | 8/1996 | Buchanan et al. | 423/210 |
| 5,728,358 | 3/1998 | Avidan et al. | 423/244.01 |
| 5,741,469 | 4/1998 | Bhore et al. | 423/244.01 |

FOREIGN PATENT DOCUMENTS

| | | | |
|---|---|---|---|
| 1154009 | 6/1969 | United Kingdom | 423/244.1 |

*Primary Examiner*—Gary P. Straub
*Assistant Examiner*—Timothy C Vanoy
*Attorney, Agent, or Firm*—Penny L. Prater; Malcolm D. Keen

[57] ABSTRACT

This invention is directed to an improved process for conversion of $H_2S$ to sulfur, using MOST(Mobil Offgas Sulfur Treatment) catalyst or sorbent. The sorbent is typically a magnesium-aluminate spinel, with oxidation promoters such as ceria and vanadia. $H_2S$ from the feed gas is used to regenerate sulfated sorbent, simultaneously producing elemental sulfur which is then condensed out. The improvement involves recycling a portion of the effluent from a downstream burner to mix with the feed to the sorbent. Thus some of the stoichiometric oxygen required for conversion of $H_2S$ to S is supplied in the form of $SO_2$ by this pre-combustion step, instead of coming totally from the oxidized/sulfated solid sorbent. This can decrease the amount of sorbent required, as well as the frequency of regenerations, thus reducing process cost. The hot recycle gas also helps to heat the feed stream.

14 Claims, 1 Drawing Sheet

PROCESS FOR TREATING H₂S-LEAN STREAMS, WITH RECYCLE OF SOX FROM BURNER

FIELD OF THE INVENTION

This invention concerns an improved process for conversion of H₂S sulfur, using a sulfated MOST(Mobil Offgas Sulfur Treatment) type catalyst or sorbent. The sorbent is typically a magnesium-aluminate spinel, with oxidation promoters such as ceria and vanadia. The improvement consists of recycling a portion of the effluent from a downstream burner to mix with the feed. Adding the recycle stream can decrease the amount of sorbent required, as well as the frequency of regenerations, thus reducing process cost.

BACKGROUND OF THE INVENTION

In a number of processes, such as the refining of crude oil, the purification of natural gas and the production of synthesis gas from, for example, fossil fuels, sulfur containing gas, in particular H₂S containing gas, is released. On account of its high toxicity and its smell, the emission of H₂S is not desirable. A number of processes directed to the removal of hydrogen sulfide from gases are known.

In some of these processes, hydrogen sulfide is first concentrated by means of a liquid absorbent, whereafter the concentrated hydrogen sulfide gas is converted into elemental sulfur. In certain cases, it is possible to omit the first step, i.e., concentrating the hydrogen sulfide, and to convert it directly to elemental sulfur. In other cases, particularly in cases with relatively low H₂S concentrations and higher CO₂ concentrations, frequently two or more concentration or separation steps are needed to produce sufficiently high hydrogen sulfide concentrations to allow economical conversion of hydrogen sulfide to elemental sulfur.

One of the best known methods of converting hydrogen sulfide to elemental sulfur is the so-called Claus process. In the Claus process, elemental sulfur is produced by reacting H₂S and SO₂ in the presence of a catalyst. The Claus system uses a combustion chamber which, at 950° C.–1,350° C., converts 50 to 70% of sulfur contained in the feed gas into elemental sulfur. Sulfur is condensed by cooling the reaction gas to a temperature below the dew point of sulfur, after which the remaining gas is heated and further reacted over a catalyst. Normally, the gas passes through at least two such Claus catalyst stages.

The different stages of the Claus process may be represented by the following equations:

$$H_2S + 3/2 O_2 \rightarrow SO_2 + H_2O \quad (I)$$

$$2H_2S + SO_2 \rightarrow 3S_n + 2H_2O \quad (II)$$

The overall reaction is:

$$3H_2S + 3O_2 \rightarrow 3S_n + 3H_2O \quad (III)$$

Below 500° C., the symbol n has a value of approximately 8.

The final Claus exhaust gas still contains small amounts of H₂S, SO₂, CS₂, COS, CO, and elemental sulfur in the form of a vapor or mist. The exhaust gas can be subjected to post-combustion to convert substantially all sulfur species to sulfur oxides, for example, SO₂ and SO₃, which are then emitted into the atmosphere.

Sulfur emitted as sulfur oxides ("SO$_x$") into the atmosphere with the exhaust gas may amount to 2–6% of the sulfur contained in the feed gas in the form of H₂S. In view of air pollution and the loss of sulfur involved, further purification is desirable and is frequently mandated.

Claus aftertreatments have been developed. These are carried out after the last Claus stage or after the post-combustion. These aftertreatments include, for example, dry and liquid phase processes for catalytic conversion of H₂S and SO₂ to elemental sulfur, catalytic hydrogenation and hydrolysis of sulfur compounds into H₂S for further processing, and oxidation of all sulfur compounds into SO$_x$ for further processing by sorption in dry processes or in wet processes.

Commonly owned U.S. Pat. No. 5,229,091 (Buchanan et al.) herein incorporated by reference, discloses the use of most catalyst or sorbent following the Claus tail-gas desulfurization process.

Commonly owned U.S. Pat. No. 5,514,351 (Buchanan et al.) is directed to desulfurizing tail-gas from sulfur recovery units using solid sorbents.

It is desired to develop a process that is effective for conversion of hydrogen sulfide to elemental sulfur without the need for the use of the Claus process and any associated processes, such as a tail gas treatment process and possibly an acid gas enrichment process.

SUMMARY OF THE INVENTION

The process and system of the instant invention allow the direct conversion of hydrogen sulfide to sulfur, especially from a gas having a higher concentration of carbon dioxide than hydrogen sulfide, without the use of the Claus process or a tail gas treatment process or an acid gas enrichment process. The process of this invention generally comprises contacting a sulfated solid oxide with a gas comprising hydrogen sulfide at conditions effective to produce elemental sulfur, said gas typically further comprising no oxygen.

A more specific embodiment of this invention, which is illustrated in FIG. 1 comprises introducing a feed gas comprising hydrogen sulfide into a first reactor comprising a sulfated solid oxide, wherein the feed gas is contacted with the sulfated solid oxide under conditions sufficient to convert the hydrogen sulfide and the sulfated solid oxide into a product mixture comprising a first vapor phase product and a solid phase product. The first vapor phase product comprises elemental sulfur vapor, water vapor and sulfur dioxide, and the solid phase product comprises desulfated solid oxide. The first vapor phase product is passed from the first reactor along with unreacted hydrogen sulfide as an effluent, and at least a portion of the solid phase product is retained in the first reactor. The first vapor phase effluent is passed into a condenser operated under conditions sufficient to condense at least a portion of the elemental sulfur to liquid sulfur, thus producing a liquid sulfur product and forming a second vapor phase product. The second vapor phase product comprises sulfur and hydrogen sulfide. The second vapor phase product is directed from the condenser along with a source of oxygen, such as air, into a burner. The burner is operated under conditions sufficient to convert substantially all of the sulfur and hydrogen sulfide contained in the second vapor phase product to a combustion product comprising sulfur oxides and frequently containing excess oxygen. The combustion product is passed into a second reactor comprising a solid oxide. A portion of the combustion product may be recycled, however to the feed gas to the sulfated solid sorbent. The second reactor is operated under conditions sufficient to combine the sulfur oxides with the solid oxide, thereby producing a solid phase product and a treated vapor phase product. The treated vapor phase product typically comprises less than about 50 ppm of sulfur oxides, and the solid phase product comprises a sulfated solid oxide. The treated vapor phase product is passed from the second reactor and at least a portion of said solid phase product is retained in said second reactor.

FIG. 1 illustrates the process described above, without recycle to feed. For every 4 moles of $H_2S$ entering with the feed, roughly one mole of "$SO_3$" in the form of sulfated sorbent, must be supplied, in order to supply enough oxygen to react with the incoming $H_2S$. Three moles of the incoming $H_2S$ react with the sulfated sorbent to form elemental sulfur, according to the reaction shown in FIG. 1. Ideally, the sulfur is captured by the condenser and removed from the process. After the sulfate capacity of the sorbent has been exhausted, about one more mole of $H_2S$ breaks through the formerly sulfated bed at the front of the process, and is converted to $SO_2$ and $SO_3$ in the burner. This SOx is captured on the sorbent bed at the end of the process, in a sulfate form that may be described as $MgO \cdot SO_3$. At the end of a cycle, the bed positions are switched via valve changes.

It may be inefficient to supply all of the required oxygen via sulfated sorbent, since that results in high amounts and/or rapid turnover of the sorbent. Sorbent cost is a major component of the overall process cost, and sorbent aging is directly related to cycling frequency. The concept of this invention is illustrated in FIG. 2, in which a portion of the burner effluent is recycled to mix with the feed. In this case, not all of the oxygen is supplied by the sorbent.

Directly after a bed switching event(i.e., the start of a new cycle),the sulfated sorbent reacts with essentially all of the incoming $H_2S$, producing sulfur, which is condensed out. The recycle stream contains little SOx at this point. However, as the "$SO_3$" content of the sulfated bed at the front of the bed is consumed, $H_2S$ starts to break through this bed and go through the burner, where is converted to SOx. A portion of this SOx-containing stream is recycled to the front of the process, where it reacts with $H_2S$ over the sorbent bed to produce S and water. If about half of the burner effluent is recycled, the sorption/desorption demand on the sorbent drops by about 50%. Thus, the sorbent amount used and vessel sizes might be reduced by as much as one-half.

Further advantages of the burner effluent recycle are that the recycle gas is supplied at high temperature (approx. 1200° F.) as required for effective regeneration of the sorbent bed. Furthermore, the total gas flow through the "sulfated" bed is increased, which can help supply heat for the endothermic desorption process. There may be increased pressure drop associated with higher flow rates, and possible need for recycle compressor, however.

Treating sour gases in Exploration and Production applications has been identified as a promising application for MOST technology. A recent Engineering study, "Economic applications for MOST Applications", by K. O. Kong, estimated a modest (10%) cost advantage for MOST ("Clausless" production of S, using $H_2S$ to regenerate sorbent) versus conventional technology (in which an acid gas enricher, followed by Claus treatment, then selective amine absorption are employed) for an E and P situation in which the acid gas contains much $CO_2$. Conventional Claus furnaces have difficulty processing such streams.

DETAILED DESCRIPTION OF THE INVENTION

Figure 1:
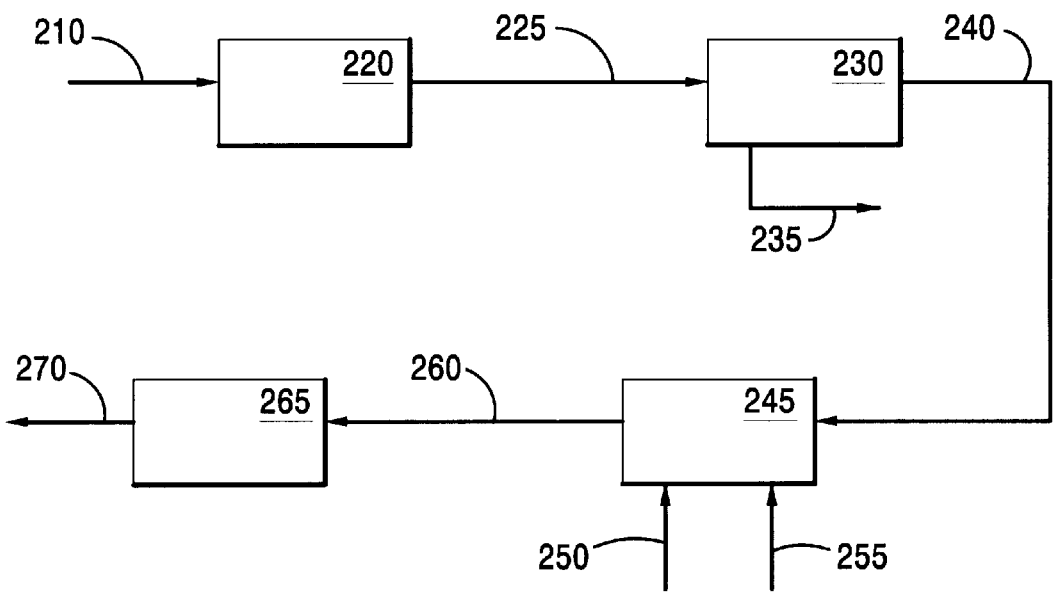
FIG. 1 is a block flow representation of a process for producing elemental sulfur directly from a hydrogen sulfide source typically having a relatively low hydrogen sulfide concentration and a higher concentration of carbon dioxide.

This invention relates to a process for the direct conversion of hydrogen sulfide to elemental sulfur. This solid oxide based process is useful to replace a Claus plant, a Claus tail gas unit and an acid gas enricher. A typical hydrogen sulfide conversion process includes the use of a hydrogen sulfide gathering system, such as a solvent (e.g. amine) absorber/stripper system, followed by a Claus plant, which is in turn followed by a Claus tail gas unit. In some cases, such as where carbon dioxide, and possibly other sulfur species, are present, and the hydrogen sulfide is available in low concentrations, the initial hydrogen sulfide gathering system is frequently followed by a second hydrogen sulfide gathering system or an acid gas enricher, such as a Flexsorb™ amine absorber/stripper system. As mentioned above, the process of the instant invention converts hydrogen sulfide directly to elemental sulfur by contacting the hydrogen sulfide with a sulfated catalyst. An advantage of this invention is that the Claus plant, the Claus tail gas unit, and the acid gas enricher processes are not needed to convert the hydrogen sulfide to elemental sulfur. This invention is most useful to treat lean gas streams typically containing less than about 50% $H_2S$, specifically less than about 25% $H_2S$, more specifically less than about 20% $H_2S$ on a volume, molar or weight basis.

The catalytic functioning of dry solid oxides for applications involving the reduction of sulfur oxides to elemental sulfur and/or $H_2S$, or the concentration of sulfur oxides for subsequent reaction in a downstream processing unit may be broadly typified by the reaction scheme illustrated below.

Solid Oxide+$SO_2$+½$O_2$→Solid Oxide•$SO_3$ (IV)

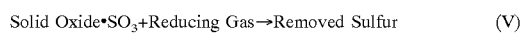
Solid Oxide•$SO_3$+Reducing Gas→Removed Sulfur (V)

Species+"Reduced Solid Oxide"

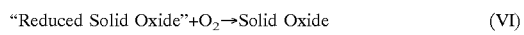
"Reduced Solid Oxide"+$O_2$→Solid Oxide (VI)

Reaction IV indicates the oxidative reaction of $SO_2$, which is thought to occur via the oxidation of sulfur oxide mixtures (i.e., $SO_2$ and $SO_3$) and the combination of the $SO_3$ with the solid oxide on the catalyst. In the open literature, this has been called "Catalyst Sulfation," and after the combination with the solid oxide, the sulfur oxide-containing material is commonly called a "Sulfated Catalyst." As used herein, "sulfation" is intended to refer both to chemisorption, such as would include sorption of $SO_3$, and physisorption, such as might be depicted M•$SO_3$, where M is the sorbent.

Reaction V involves the reduction or regeneration of the so-called sulfated catalyst. The sulfur oxides are released primarily as a mixture of $SO_2$, elemental sulfur, $H_2S$, and other sulfur containing compounds. The reaction also leads to a solid oxide which reacts with oxygen and thus is termed a "Reduced Solid Oxide." A partial list of gases generally considered as reductants suitable to induce the release of the sulfur compounds are hydrogen containing streams (e.g., steam reformer or naphtha reformer hydrogen, catalytic hydrogenation unit purge streams, etc.), and hydrocarbons such as propane.

Reaction VI represents the oxidative calcination of the "Reduced Solid Oxide." It may be the reaction of air or other suitable oxidizing media with the reduced solid oxide, and yields a calcined solid oxide which may undergo more cycles of reactions IV through VI above. If desired, reaction VI may be combined with reaction IV to eliminate one processing step.

Dry sulfur oxide removal processes have typically experienced limited sulfur oxide loading capability. A process recently disclosed in commonly assigned U.S. Pat. No. 5,229,091 increases the loading capability of the solid oxide significantly, up to about 60 weight percent $SO_3$ on solid oxide.

A generalized representation of some of the reactions believed, without intending to be bound thereby, to be involved in the process of the instant invention is given below.

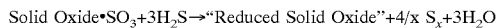

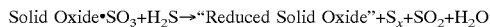

The hydrogen sulfide acid gas contacts the sulfated solid oxide and produces about a 75% selectivity to elemental sulfur. The products of this set of reactions are primarily elemental sulfur, water vapor, and sulfur dioxide, however, side reactions leading to other products are also possible.

Any diluent compounds in the acid gas other than hydrogen sulfide, such as hydrocarbons, nitrogen, carbon dioxide and carbon monoxide, among others, typically pass through the sulfated catalyst bed unreacted, react with one or more of the other compounds present, possibly to produce additional sulfur, or aid in the production of sulfur compounds from the solid oxide. The heat capacity of these diluent compounds also acts as a source of heat for the endothermic reactions described above.

A process for the direct conversion of hydrogen sulfide to elemental sulfur is illustrated in FIG. 1. A feed gas comprising hydrogen sulfide is directed through line 210 over at least one solid oxide bed 220, where the gas passes over a sulfated solid oxide sorbent operated at conditions effective to allow removal of sulfur compounds from the sulfated solid oxide. According to the method of this invention, the feed gas typically contains no measurable oxygen at the point that it passes over the sulfated solid oxide. As described above, the hydrogen sulfide reacts with the sulfated solid oxide sorbent to produce elemental sulfur in a vapor phase, among other components. The stream comprising the elemental sulfur is then directed from the solid oxide bed 220 through line 225 to a sulfur condenser 230. Liquid sulfur is condensed in the sulfur condenser 230, and is withdrawn through line 235 and a vapor product is withdrawn through line 240. The vapor product passing through line 240 is directed to a burner 245 where oxidizable components are combusted with air introduced through line 250 and, optionally, combustible fuel, such as natural gas, introduced through line 255. The gaseous combustion products comprising sulfur oxides are directed from the burner 245 through line 260 to a bed of generally unsulfated (or desulfated) solid oxide 265, operated at conditions such that sulfur oxides are chemisorbed onto the solid oxide. Treated gas comprising a small amount, e.g., typically less than about 50 ppm sulfur oxides, is discharged from the bed of partially or completely unsulfated (or desulfated) solid oxide 265 through line 270.

Figure 2:
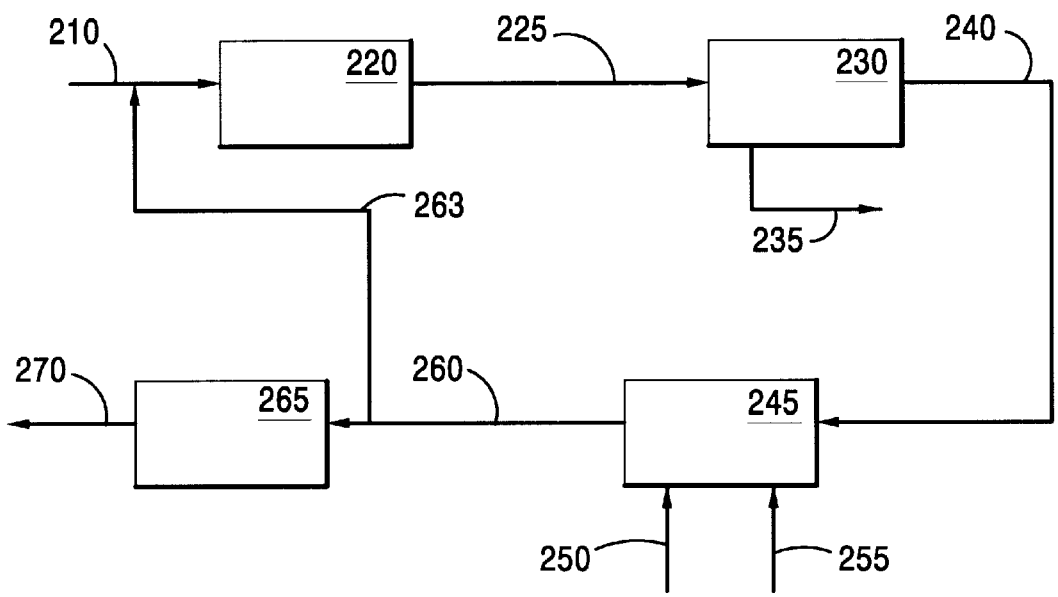
FIG. 2 illustrates a departure from FIG. 1, wherein a portion of the combustion product (containing $SO_2$ and $SO_3$, SOx) is recycled to the feed gas to the sulfated solid sorbent.

It may be inefficient to supply all of the required oxygen via sulfated sorbent, since that results in high amounts and/or rapid turnover of the sorbent. Sorbent cost is a major component of the overall process cost, and sorbent aging is directly related to cycling frequency. The concept of this invention is illustrated in FIG. 2, in which a portion of the burner effluent is recycled (through line 263) to mix with the feed. In this case, not all of the oxygen is supplied by the sorbent.

Directly after a bed switching event (i.e., the start of a new cycle), the sulfated sorbent reacts with essentially all of the incoming $H_2S$, producing sulfur, which is condensed out. The recycle stream contains little SOx at this point. However, as the "$SO_3$" content of the sulfated bed at the front of the bed is consumed, $H_2S$ starts to break through this bed and go through the burner, where is converted to SOx. A portion of this SOx-containing stream is recycled to the front of the process, where it reacts with $H_2S$ over the sorbent bed to produce S and water. If about half of the burner effluent is recycled, the sorption/desorption demand on the sorbent drops by about 50%. Thus, the sorbent amount used and vessel sizes might be reduced by as much as one-half.

Further advantages of the burner effluent recycle are that the recycle gas is supplied at high temperature (approx. 1200° F.) as required for effective regeneration of the sorbent bed. Furthermore, the total gas flow through the "sulfated" bed is increased, which can help supply heat for the endothermic desorption process. There may be increased pressure drop associated with higher flow rates, and possible need for a recycle compressor, however.

Typical conditions for the contact of the sulfated solid oxide with the hydrogen sulfide containing feed gas include a temperature of about 900° F. to about 1,400° F., specifically about 1,100° F. to about 1,300° F., and a pressure of typically about 0.10 to about 10 atmospheres, specifically about 0.5 to about 5 atmospheres. Lower contact temperatures tend to produce higher percentages of elemental sulfur in the product gases. The gas stream is typically passed over the solid oxide at a gas hourly space velocity (GHSV) of about 10 to about 20,000 hr$f^{-1}$, specifically about 20 to about 10,000 hr$^{-1}$, more specifically about 50 to about 1,000 hr$^{-1}$. The feed gas stream may also contain carbon dioxide, carbon monoxide, sulfur dioxide, and water vapor, among other components that are typically present in acid gas streams.

The feed gas may be heated to the desired temperature directly or indirectly as desired, for example, the feed gas may be heated in a fired heater or in a heat exchanger. Alternatively, at least part of the feed gas may be partially combusted or combusted substoichiometrically using a source of oxygen, such as air, and if needed, fuel, such as natural gas or fuel gas, to heat the feed gas to the desired temperature. Also, the feed gas may be heated to the desired temperature by combusting fuel with a source of oxygen and then combining the hot combustion products with the hydrogen sulfide containing feed gas. The feed gas may also be heated using a combination of the above described methods. The total amount of feed gas needed is that which provides at least about 75% to about 1,000% of the stoichiometric reducing gas requirement and about 75% to about 1,000% of the thermal gas requirements at the desired temperature. The thermal requirement of the hydrogen sulfide containing feed gas is that volume required to achieve and maintain the temperature desired for contacting the feed gas with the solid oxide. It should be noted that the reaction of hydrogen sulfide with the sulfated solid oxide sorbent according to the method of this invention is typically endothermic. Exothermic reactions involving hydrogen sulfide to produce elemental sulfur, e.g., partial oxidation, are possible, but are not included as part of this invention.

The feed gas flow should be discontinued from the bed when the desired amount of sulfur compounds have been removed from the bed, for example after removal of about 25%, specifically about 33%, more specifically about 50%, still more specifically about 75%, and most specifically all or almost all of the sulfur compounds from the bed. A possible indicator of this point would be the temperature of the bed or of the exit gas. Typically the bed will cool off during the desulfation of the solid oxide. Useful temperature indicators may include the temperature of the bed or of the exit gas; a temperature differential between the temperature of the bed or the exit gas at the time of introduction of feed gas to the bed and at some later time; a rate of change in the temperature of the bed or the exit gas; or some combination of these indicators.

The sulfur condenser is typically operated at a temperature of about 250° F. to about 350° F. and a pressure of about 0.1 to about 10 atmospheres to condense the elemental sulfur without condensing water. Products from the sulfur condenser include elemental sulfur and a vapor stream. The vapor stream comprises at least one of elemental sulfur, sulfur dioxide, hydrogen sulfide and water vapor, among other components.

The temperature in the burner mentioned above is typically held within the range of about 1,000° F. to about 2,500° F., and, preferably, the burner is operated to maintain an atmosphere effective to convert substantially all of the sulfur compounds in the gas stream to sulfur oxides ($SO^x$). Typically, the burner converts at least 85%, specifically at least 90%, more specifically at least 95%, most specifically at least 99% of the sulfur compounds in the vapor stream to sulfur oxides. This conversion level is referred to herein as substantially all of the sulfur compounds. The burner is typically operated at a pressure of about 0.1 to about 10 atmospheres and contains an excess oxygen concentration of about 0.1 to about 10 mol. %, specifically about 2 to about 4 mol. % excess oxygen, and more specifically sufficient oxygen to satisfy the requirements of equations (IV) and (VI) as described above (e.g., at least about one-half mole of oxygen per mole of $SO_2$ present). The burner may also comprise one or more catalysts effective for oxidization of sulfur compounds to sulfur oxides. Supplemental fuel may be added to the burner to maintain the desired reaction temperature. This supplemental fuel may be any commonly available combustible fuel, e.g., natural gas, refinery or petrochemical fuel gas, solid, gaseous or liquid hydrocarbons.

Other feed streams which contain at least one sulfur compound may also be introduced into the burner, such as gas streams that have low $H_2S$ concentrations, contain substantial amounts of hydrocarbons, or contain other sulfur compounds. These other feed streams are frequently low volume streams that are produced as byproducts of other treating or gas handling processes, examples of these streams include $SO_2$ containing streams and mercaptan containing streams among others. Typically, according to the method of this invention, the total amount of sulfur contained in these other feed streams is less than about twice the total amount of sulfur in the feed gas, specifically less than the amount of sulfur in the feed gas, more specifically less than half the amount in the feed gas, most specifically less than one quarter the total amount of sulfur in the feed gas.

The solid oxide sorbent, mentioned above, which is at least partially unsulfated (or desulfated) and which contacts the sulfur oxides produced in the burner, is typically operated at a temperature of about 400° F. to about 1,800° F., specifically about 900° F. to about 1,400° F., more specifically about 1,000° F. to about 1,300° F., a pressure of about 0.1 to about 10 atmospheres, specifically about 0.5 to about 5 atmospheres, with an inlet oxidizing agent or oxygen ($O_2$) concentration of at least about one-half mole per mole of $SO_2$ in the vapor stream, and at a flow rate sufficient to provide a gas hourly space velocity (GHSV) of about 500 to about 20,000 $hr^{-1}$, specifically about 3,000 to about 5,000 $hr^{-1}$. The solid oxide is operated under conditions effective to remove substantially all of the sulfur oxides from the vapor stream. The term "substantially all" is used herein to refer to removal of at least 85%, specifically at least 90%, more specifically at least 95%, most specifically at least 99% of the sulfur oxides in the vapor stream. According to the method of this invention, it is possible to produce a treated gas containing less than about 50 ppm $SO_x$, specifically less than about 10 ppm $SO_x$, more specifically less than about 5 ppm $SO_x$, most specifically less than about 1 ppm $SO_x$. An additional benefit of operating within these parameters is that any carbon monoxide in the vapor stream is typically converted to carbon dioxide which can be released into the atmosphere.

When sulfur oxide breakthrough is detected or some other switch criteria has been met, the flow of the sulfur oxide containing vapor stream across the solid oxide is stopped, and the feed gas stream comprising hydrogen sulfide is directed over the solid oxide to release at least a portion of the sulfur compounds from the solid oxide. Suitable means may be used to detect sulfur oxide breakthrough, such as a Siemens Ultramat 22P infrared analyzer or comparable equipment, or suitable means may be used to determine the desired switchpoint, such as a timer or a total flow integrator, which means may also comprehend the sulfur oxide concentration of the vapor stream.

Also, similar to the system described above for determining when to stop feed gas flow, temperature of the solid oxide bed or the gas leaving the solid oxide bed may be used as the switch criteria. Here, the sulfation reaction is typically exothermic, so the bed temperature may increase as the reaction continues.

This invention can be used to advantage with the catalyst being disposed in any conventional solid catalyst system, in ebullating catalyst bed systems, in systems which involve continuously conveying or circulating catalyst from one bed of solid oxide to another, fixed bed systems and the like. Typical of the circulating catalyst bed systems are the conventional moving bed and fluidized bed reactor regenerator systems. Both of these circulating bed systems are conventionally used in hydrocarbon conversion, e.g., hydrocarbon cracking.

The form and the particle size of the solid oxide are not critical to the present invention and may vary depending, for example, on the type of solid catalyst system employed. Non-limiting examples of the shapes of the solid oxide for use in the present invention include balls, pebbles, spheres, extrudates, channeled monoliths, honeycomb monoliths, microspheres, pellets or structural shapes, such as lobes, pills, cakes, powders, granules, and the like, formed using conventional methods, such as extrusion or spray drying. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized systems, it is preferred that the major amount by weight of the particles have a diameter in the range of about 10 microns to about 250 microns, more preferably about 20 microns to about 150 microns.

The solid oxide useful in this invention typically has a surface area (by the conventional B.E.T. method) in the range of about 5 m$^2$/gm. to about 600 m$^2$/gm., specifically about 15 m$^2$/gm. to about 400 m$^2$/gm., and more specifically about 20 m$^2$/gm. to about 300 m$^2$/gm.

Non-limiting examples of suitable solid oxides for use in the present invention include the porous solids, alumina, silica, silica-alumina, natural and synthetic zeolites, activated carbon, spinels, clays and combinations thereof. Gamma ($\gamma$) alumina, chi-eta-rho ($\chi,\eta,\rho$) alumina, delta ($\delta$) alumina, and theta ($\theta$) alumina are particularly useful as solid oxides and supports in the present invention because of their high surface areas. While alpha ($\alpha$) alumina and beta ($\beta$) alumina can be used as solid oxides, they are not as effective as gamma, chi-eta-rho, delta and theta alumina. One or more oxides of other metals can also be used as solid oxides, either alone or in combination with alumina or as spinels, such as, for example, bismuth, manganese, yttrium, antimony, tin, Group IA metals, Group IIA metals, rare earth metals, and combinations thereof. Magnesium aluminates are particularly useful as solid oxides. These may be magnesium or aluminum rich with magnesium aluminate spinels preferred. Lanthanum and cerium are preferred rare earth metals. Naturally occurring rare earths, such as in the form of baestenite, are also useful solid oxides. Elemental copper or copper compound solid oxides can also be used. The copper oxide can be cuprous oxide ($Cu_2O$) and/or cupric oxide (CuO). Other copper compounds can be used, such as copper (II) sulfate, copper (II) acetate, copper (II) formate, copper (II) nitrate and/or copper (II) chloride. The solid oxide can also be a blend/mixture of high density and low density materials, such as of the above-identified metal oxides.

Also, a metal or metal oxide may be deposited on the solid oxide or may be used alone. The metal or metal oxide part of the solid oxide can be supported, carried and held on a refractory support or carrier material which also provides part of the solid oxide. The support controls the attrition and surface area characteristics of the solid oxide. The support preferably has a surface area greater than about 10 m$^2$/g and most preferably from about 20 m$^2$/g to about 500 m$^2$/g for best results. Suitable supports include, but are not limited to, silica, alumina, silica-alumina, zirconia, titania, thoria, kaolin or other clays, diatomaceous earth, boria, and/or mullite. The support can comprise the same material as the metal or metal oxide part of the solid oxide.

The solid oxide may be combined with a matrix or binder, including the supports mentioned above, preferably alumina. The solid oxide may also be used without a matrix or binder. The support material may also be present in the bed containing the solid oxide in particles separate from the particles of solid oxide. Also, optionally present in the bed containing the solid oxide may be particles of an inert material, wherein the term "inert" is used herein to represent materials that are less effective than the solid oxide when used in the sulfation/desulfation cycles described herein.

The solid oxide can be impregnated or otherwise coated with at least one oxidizing catalyst or promoter that promotes the removal of nitrogen oxides, the oxidation of $SO_2$ to $SO_3$ in the presence of oxygen, and the removal of the sulfur compounds from the solid oxide. It is believed that $SO_3$ is more readily combined with the solid oxide than $SO_2$. One useful catalyst is ceria (cerium oxide). Another useful catalyst is platinum. Yet another useful catalyst is vanadium. Other catalytic metals, both free and in a combined form, preferably as an oxide form, can be used, either alone or in combination with each other or in combination with ceria and/or alumina, such as rare earth metals, metals from Group VIII of the Periodic Table, chromium, vanadium, rhenium, tungsten, silver, and combinations thereof. The promoter can comprise the same material as the solid oxide. An even distribution of the promoter is preferred for best results and to minimize solid oxide erosion.

Useful Group IA metals include lithium, sodium, potassium, rubidium, and cesium. Useful Group IIA metals include magnesium, calcium, strontium, and barium. Useful Group VII metals are the Group VII noble metals (the platinum family of metals) including ruthenium, rhodium, palladium, osmium, iridium, and platinum. Also useful are Group IB metals, Group IIB metals, and Group VIA metals. The rare earth metals are also useful and are referred to as the lanthanides. Suitable rare earth metals include lanthanum, cerium, praseodymium, neodymium, samarium, europium, gadolinium, terbium, dysprosium, holmium, erbium, thulium, ytterbium, and lutetium. More preferably, the promoter may be selected from the rare earth metals, the platinum group metals and mixtures thereof. Particularly good results are achieved when the promoter is cerium and/or platinum, with cerium giving outstanding results.

A second promoter, if present, may be selected from the metal or the metal oxide form of iron, nickel, titanium, chromium, manganese, cobalt, germanium, tin, bismuth, molybdenum, antimony, vanadium and mixtures thereof. More preferably, the second promoter is selected from iron, nickel, cobalt, manganese, tin, vanadium and mixtures thereof. Additional metals may be also incorporated into the solid oxide. For example, the solid oxide may include small or trace amounts of additional metals or metal oxides, such as lanthanum, iron, sodium, calcium, copper, and titanium.

The specific amounts of the promoters included in the solid oxide, if present at all, may vary widely. Preferably, the first promoter is present in an amount between about 0.001% to about 20% by weight, calculated as elemental metal, of the solid oxide, and the second promoter is present in an amount between about 0.001% to about 10% by weight, calculated as elemental metal, of the solid oxide. Preferably, the solid oxide includes about 0.1% to about 20%, more preferably about 0.2% to about 20%, and still more preferably about 0.5% to about 15%, by weight of rare earth metal, calculated as elemental metal. Of course, if a platinum group metal is employed in the solid oxide, very much reduced concentrations (e.g., in the parts per thousand to parts per million (ppm) range) are employed. If vanadium is included as the second promoter, it is preferably present in an amount of about 0.01% to about 7%, more preferably about 0.1% to about 5%, and still more preferably about 0.5% to about 2% by weight of vanadium, calculated as elemental metal.

The promoters may be associated with the solid oxide using any suitable technique or combination of techniques; including, for example, impregnation, coprecipitation, ion-exchange and the like, well known in the art. Also, the promoters may be added during synthesis of the solid oxide. Thus, the promoters may be an integral part of the solid oxide or may be in a phase separate from the solid oxide (e.g., deposited on the solid oxide) or both. These metal components may be associated with the solid oxide together or in any sequence or by the same or different association techniques. Cost considerations favor the preferred procedure in which the metal components are associated together with the solid oxide. Impregnation may be carried out by contacting the solid oxide with a solution, preferably an aqueous solution, of the metal salts.

It may not be necessary to wash the solid oxide after certain soluble metal salts (such as nitrate, sulfate or acetate) are added. After impregnation with the metal salts, the solid oxide can be dried and calcined to decompose the salts, forming an oxide in the case of a nitrate, sulfate or acetate.

The above-mentioned solid oxides are generally discussed in U.S. Pat. No. 4,692,318 which issued to Tolpin et al. on Sep. 8, 1987. This patent is hereby incorporated by reference herein.

In one general aspect, the present invention may involve use of a solid oxide which is represented by the following empirical formula $$Mg_xAl_yO_z$$

where the atomic ratio of x to y ranges from about 0.1 to about 10 and where z is at least as required to accommodate the valances of the Mg and Al components of the solid oxide. This solid oxide may have the spinel structure and may contain at least one of the promoters described above.

Metal-containing spinels according to the above empirical formula that are useful in the present invention include the alkaline earth metal spinels, in particular magnesium (first metal) and aluminum (second metal)-containing spinel. Other alkaline earth metal ions, such as calcium, strontium, barium and mixtures thereof, may replace all or a part of the magnesium ions. Similarly, other metal ions, such as iron, chromium, vanadium, manganese, gallium, boron, cobalt, Group IB metals, Group IV metals, Group VA metals, the platinum group metals, the rare earth metals, Te, Nb, Ta, Sc, Zn, Y, Mo, W, TI, Re, U, Th and mixtures thereof, may replace all or a part of the aluminum ions, preferably only a part of the aluminum ions.

The metal-containing spinels useful in the present invention may be derived from conventional and well known sources. For example, these spinels may be naturally occurring or may be synthesized using techniques well known in the art. Thus, a detailed description of such techniques is not included herein. A particularly useful process for preparing the solid oxide is presented in U.S. Pat. No. 4,728,635 (Bhattacharyya, et al.) the specification of which is incorporated by reference herein.

The Group IA, IIA, IB metals, Group IIB metals, Group IV metals, Group VA metals, Group VIA, and Group VII metals referred to herein are those listed in the Periodic Table of the Elements in the *Handbook of Chemistry and Physics* (61 st Edition).

Free magnesia and/or alumina (i.e., apart from the alkaline earth metal containing spinel) also may be included in the present solid oxide, e.g., using conventional techniques. For example, in one embodiment, the solid oxide preferably includes about 0.1% to about 30% by weight of free magnesia (calculated as MgO).

As mentioned above, potential solid oxides are magnesia rich, magnesium aluminate spinels. One example of such a spinel is a commercial magnesia rich, magnesium aluminate spinel containing 0 to 100 wt. % excess magnesia, 5 to 15 wt. % cerium, and 1 to 5 wt. % vanadium. These solid oxides are substantially described in U.S. Pat. Nos. 4,790,982 to Yoo et al.; 4,472,267 to Yoo et al.; and 4,469,589 to Yoo et al. The disclosures of U.S. Pat. Nos. 4,790,982; 4,472,267; and 4,469,589 are herein incorporated by reference. In general, the magnesium aluminate spinels useful in the present invention may be prepared by methods which are conventional and well known in the art.

We claim:

1. A process for treating a hydrogen sulfide lean feed gas stream to convert the hydrogen sulfide to elemental sulfur, said process comprising the steps of:
   (a) introducing a recycle stream of sulfur oxides, and said hydrogen sulfide lean feed gas stream into a first reactor comprising a sulfated solid oxide sorbent, wherein said feed gas stream is contacted with said sulfated sorbent under conditions sufficient to convert said hydrogen sulfide and said sulfated sorbent into a first vapor phase product stream and a desulfated sorbent, said first vapor phase product stream comprising elemental sulfur vapor, water vapor and sulfur dioxide, said first vapor phase product stream being passed from said first reactor along with unreacted hydrogen sulfide as an effluent stream;
   (b) passing the effluent stream from step (a) into a condenser operated under conditions sufficient to condense at least a portion of the elemental sulfur vapor to liquid sulfur, wherein a liquid sulfur product is obtained and a second vapor phase product stream is formed, said second vapor phase product stream comprising sulfur and hydrogen sulfide, said second vapor phase product stream being passed from the condenser;
   (c) passing said second vapor phase product stream from step (b) along with a source of oxygen into a burner operated under conditions sufficient to convert substantially all of the sulfur and hydrogen sulfide in the second vapor phase product stream from step (b) to a combustion product stream comprising sulfur oxides, said conditions comprising a greater than stoichiometric amount of oxygen;
   (d) recycling to step (a) a first portion of the combustion product stream from step (c) as said recycle stream of sulfur oxides;
   (e) passing a remainder portion of the combustion product stream from step (c) into a second reactor comprising a desulfated sorbent under operating conditions sufficient to combine the sulfur oxides in said remainder portion of the combustion product stream from step (c) with said desulfated sorbent in the second reactor, thereby producing a second sulfated sorbent and a treated vapor phase product stream, said treated vapor phase product stream comprising less than about 50 ppm of sulfur oxides, said treated vapor phase product stream being passed from said second reactor; and
   (f) then switching feeds to said first reactor and said second reactor so that said recycle stream and said feed gas stream are introduced into said second reactor, and said remainder portion of the combustion product stream is passed into said first reactor;
   wherein hydrogen sulfide in said feed gas stream is converted to elemental sulfur without the use of a Claus plant.

2. The process according to claim 1 comprising increasing the temperature of said second vapor phase product stream produced in step (b) either before contacting the burner of step (c), inside the burner of step (c), or after contacting the burner of step (c) to a temperature effective to allow at least a portion of the sulfur oxides contained in the combustion product stream of step (c) to be combined with said desulfated sorbent in the second reactor in step (e).

3. The process according to claim 1 comprising selecting the solid oxide in steps (a) and (e) from the group consisting of gamma alumina, chi-eta-rho alumina, delta alumina, theta alumina, silica, natural and synthetic zeolites, activated carbon, spinels, clays, magnesium aluminates and combinations thereof.

4. The process according to claim 1 comprising selecting the solid oxide in steps (a) and (e) from magnesium aluminate spinel further comprising at least one promoter.

5. The process according to claim 1, wherein the conditions for converting said hydrogen sulfide and said sulfated sorbent into said first vapor has product stream and said desulfated, sorbent of step (a) comprise a temperature of about 900° F. to about 1,4000° F., a pressure of about 0.10 atmospheres to about 10 atmospheres, and a gas hourly space velocity (GHSV) of about 10 to about 20,000 hr$^{-1}$.

6. The process according to claim 1, wherein the operating conditions of the condenser in step (b) comprise a temperature of about 250° F. to about 350° F., and a pressure of about 0.10 atmospheres to about 10 atmospheres.

7. The process according to claim 1, wherein the operating conditions of the burner in step (c) comprise a temperature of about 1,000° F. to about 2,500° F., a pressure of about 0.10 atmospheres to about 10 atmospheres, and about 0.10 to about 10 mole percent excess oxygen.

8. The process according to claim 1, wherein the operating conditions of step (e) in said second reactor comprise a temperature of about 400° F. to about 1,800° F., a pressure of about 0.10 atmospheres to about 10 atmospheres, and a gas hourly space velocity (GHSV) of about 500 hr$^{-1}$ to about 20,000 hr$^{-1}$.

9. The process according to claim 1 wherein hydrogen sulfide in said feed gas stream is converted to elemental sulfur without the use of a tail gas unit, or an acid gas enricher.

10. The process according to claim 1 wherein said feed gas stream comprises no measurable oxygen.

11. The process according to claim 1 wherein said feed stream has a higher concentration of carbon dioxide than hydrogen sulfide.

12. The process according to claim 1 wherein said feed gas stream contains less than about 50% hydrogen sulfide on a volume, molar or weight basis.

13. The process according to claim 1 wherein said feed gas stream contains less than about 20% hydrogen sulfide on a volume, molar or weight basis.

14. The process according to claim 1 wherein said recycle stream of sulfur oxides, and said feed gas stream are combined before entry into said first reactor.

* * * * *